United States Patent
Miyahara et al.

[11] Patent Number: 5,209,318
[45] Date of Patent: May 11, 1993

[54] CONSTANT-SPEED CRUISING SYSTEM FOR A VEHICLE

[75] Inventors: Katumi Miyahara; Yoshiaki Anan; Yoshiki Kubo; Hiroshi Ueda; Takeshi Yamane, all of Hiroshima, Japan

[73] Assignees: Mazda Motor Corporation; NALDEC Corporation, Hiroshima, Japan

[21] Appl. No.: 841,274

[22] Filed: Feb. 26, 1992

Related U.S. Application Data

[63] Continuation of Ser. No. 516,191, Apr. 30, 1990, abandoned.

[30] Foreign Application Priority Data

Apr. 30, 1989 [JP] Japan ................................. 1-110787

[51] Int. Cl.⁵ .................................................. B60K 31/04
[52] U.S. Cl. .................................. 180/178; 364/426.04
[58] Field of Search ............... 180/179, 178, 177, 176, 180/170; 364/426.04

[56] References Cited

U.S. PATENT DOCUMENTS

| | | | |
|---|---|---|---|
| 4,921,063 | 5/1990 | Masuda | 180/178 |
| 4,928,779 | 5/1990 | Yamada | 180/179 |
| 4,939,657 | 7/1990 | Imai et al. | 180/179 |
| 5,024,284 | 6/1991 | Nakano et al. | 180/179 |
| 5,038,879 | 8/1991 | Naito et al. | 180/179 |
| 5,038,880 | 8/1991 | Matsuoka et al. | 180/179 |

FOREIGN PATENT DOCUMENTS 0153345 6/1989 Japan ................................. 180/178

*Primary Examiner*—David M. Mitchell
*Attorney, Agent, or Firm*—Fish & Richardson

[57] ABSTRACT

The main switch is turn on to supply electricity to the control unit for constant-speed crusing control, and a target vehicle speed is set on the basis of an instruction signal from a set switch. The constant-speed cruising control is executed so as for the actual vehicle speed to reach the target vehicle speed. As one of conditions for executing the constant-speed cruising control, the lapse of a predetermined time period from the start of the main switch is added. This arrangement enables the start of execution of the constant-speed cruising control only when the self-diagnosis of the control unit or initialization of various data has been completed.

6 Claims, 7 Drawing Sheets

CONSTANT-SPEED CRUISING SYSTEM FOR A VEHICLE

This application is a continuation of U.S. application Ser. No. 07/516,191, filed Apr. 30, 1990, now abandoned.

BACKGROUND OF THE INVENTION

1. Field of the Invention

The present invention relates to a constant-speed cruising system for a vehicle, adapted to automatically control a vehicle speed governing mechanism of an engine so as to reach a target vehicle speed set by the driver.

2. Description of Related Art

For the engine of an Otto type, for example, it is common that a constant-speed cruising system for the vehicle is designed to subject a vehicle speed governing mechanism such as a throttle valve and so on to feedback control on the basis of output from a vehicle speed detecting means for detecting an actual vehicle speed.

Japanese Utility Model Examined Publication (Kokoku) No. 10,361/1984 discloses a constant-speed cruising system in which a microcomputer is used as a control unit for constant-speed cruising control. This constant-speed cruising system has a set switch and a cancel switch as instruction signal outputting means to be outputted to the control unit. The set switch has the function to set an actual vehicle speed to a target vehicle speed for constant-speed cruising control at the time when the driver has turned the set switch on. When the set switch has been turned on, the control unit is designed so as to adjust the actual vehicle speed to reach a target vehicle speed by accumulating a necessary amount of data on vehicle speeds from the vehicle speed sensor and setting a mean value of the vehicle speeds to the target vehicle speed.

The constant-speed cruising system is provided with a main switch for supplying electricity to the control unit. When the main switch is turned on, it is common that the self-diagnosis of the microcomputer disposed therefor is executed or various data stored is initialized.

SUMMARY OF THE INVENTION

The present invention has the object to provide a constant-speed cruising system for a vehicle adapted to prevent an error in operation of the constant-speed cruising control, which may be caused at the initial stage when a main switch is turned on.

In order to achieve the object, the present invention consists of a constant-speed cruising system for a vehicle, comprising:

a vehicle speed governing means of an engine;

a control unit for constant-speed cruising control, which controls the vehicle speed governing means so as for a vehicle speed to reach a target vehicle speed;

a main switch for turning on or off a supply of an electric source to the control unit; and a set switch for setting a vehicle speed at time when the main switch is manually turned on to a target vehicle speed for constant-speed cruising control;

wherein the control unit has an inhibition means for inhibiting the setting of the target vehicle speed on the basis of the set switch for a period of time for which a predetermined time period elapses after the main switch is turned on.

This arrangement can inhibit the implementation of the constant-speed cruising control even if the set switch would be turned on while electricity is supplied to the control unit for the constant-speed cruising control and the self-diagnosis or initialization of the control unit is executed.

It is hence to be noted that the present invention prevents an error in operation followed by execution of constant-speed cruising control prior to completion of the self-diagnosis or initialization of the control unit, for example, namely, avoids an inaccurate implementation of constant-speed crusing control accompanied with execution of the constant-speed cruising control prior to an adequate intake of current data.

Other objects, features and advantages of the present invention will become apparent in the course of the description of the preferred embodiments which follows, in conjunction with the accompanying drawings.

DETAILED DESCRIPTION OF THE PREFERRED EMBODIMENTS

Outline Construction

Figure 1:
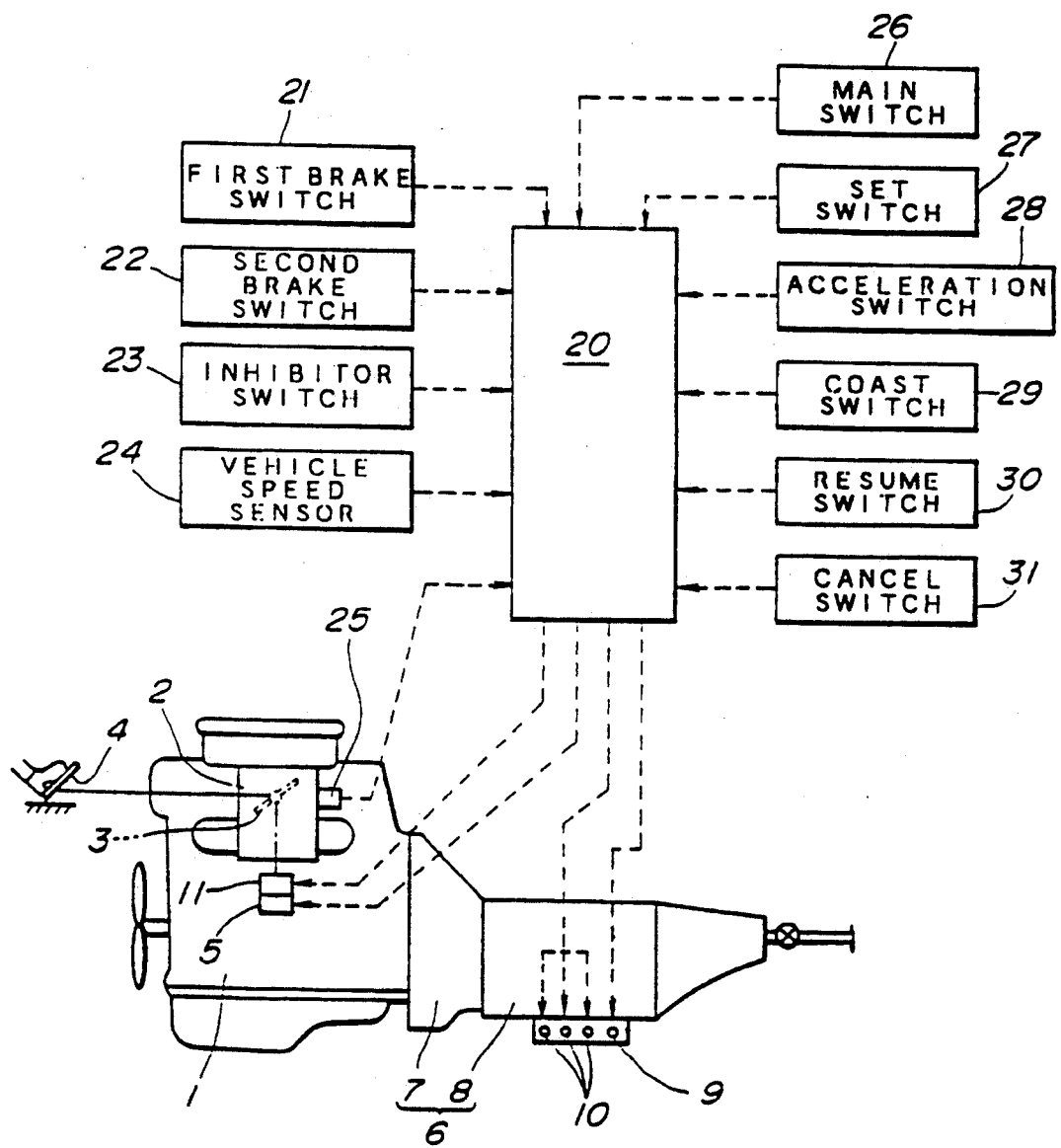
FIG. 1 is a diagrammatic representation showing an outline of an overall system according to the present invention.

As shown in FIG. 1, reference numeral 1 denotes an engine of the Otto type, which is provided at its air intake system 2 with a throttle valve 3 as a valve for controlling output. The throttle valve 3 is mechanically connected to an accelerator pedal 4 and designed so as to be manually opened or closed in accordance with the degree to which the accelerator pedal 4 is stepped down as well as to be automatically opened or closed by a servo motor 5 as an actuator. The engine 1 is connected to an automatic transmission 6 and its output is transmitted through the automatic transmission 6 to wheels (not shown).

The automatic transmission 6 comprises a torque converter 7 and a multiple-stage gear set 8 of a planetary gear type. The torque converter 7 has a lock-up clutch (not shown) which is coupled or uncoupled by activating or inactivating a solenoid 9 for lock-up operation. The multiple-stage gear set 8 is designed so as to have four forward speed ranges, for example, and a desired speed stage can be performed by altering a combination of activation with inactivation of a plurality of solenoids 10 for shift operation, in the manner well known to the art. Needless to say, the solenoids 9 and 10 can shift modes of operation of a hydraulically-operable actuator for lock-up operation or for shift operation and further description thereof will be omitted herein because they are well known to those skilled in the art.

As shown in FIG. 1, reference numeral 20 denotes a control unit consisting of a microcomputer having RAM, ROM and so on, and signals are inputted into the control unit 20 from each of the sensors and switches 21 to 31, inclusive.

The switches 21 and 22 are brake switches which are to be turned on by stepping a foot brake pedal (not shown) down or by braking. The reason for disposing two of the brake pedals is such that, even if one of them would not work, the other can start working. The switch 23 is an inhibitor switch that is turned on when the automatic transmission 6 is in the range "D" position. The sensor 24 is to detect the vehicle speed. The sensor 25 is a potentiometer for detecting an opening angle of the throttle valve 2, or the throttle opening angle. The switches 26 to 31, inclusive, are for constant-speed cruising to be manually operated by the driver, in which the switch 26 is a main switch, the switch 27 is a set switch, the switch 28 is an acceleration switch, the switch 29 is a coast switch, the switch 30 is a resume switch, and the switch 31 is a cancel switch.

The control unit 20 generates shift control signals to each of the solenoids 9 and 10, a constant-speed control signal to the servo motor 5, and ON/OFF signals to a clutch 11 disposed at the servo motor 5. When the ON signal is generated, on the one hand, the clutch 11 is coupled to thereby connect the servo motor 5 to the throttle valve 3, while when the OFF signal is generated to the clutch 11 from the control unit 20, on the other, the clutch 11 is uncoupled to disconnect the servo motor 5 from the throttle valve 3.

Outline of Constant-Speed Cruising Control

The shift control (lock-up control) by the control unit 20 may be performed in conventional manner so that description thereof in detail will be omitted herein for avoidance of duplicate explanation. A description of the constant-speed crusing control is described herein.

When the constant-speed cruising control is not under way, on the one hand, the clutch 11 is in an uncoupled state and the throttle valve 3 is disconnected from the actuator 5 (servo motor). The throttle valve 3 is designed so as to be opened or closed exclusively by means of manual operation, namely, by stepping the accelerator pedal 4 or by releasing the pedal 4. When the constant-speed cruising control is under way, on the other hand, the clutch 11 is in a coupled state, thereby allowing the throttle valve 3 to be coupled with the actuator 5. In this case, the throttle valve 3 is designed so as to be automatically controlled regardless of the stepping of the accelerator pedal 4.

The modes of operation of the switches to be used for the constant-speed cruising control will be described in the following way.

The main switch 26 may be of a push-push type and keeps its ON or OFF state unless it is further operated. The set switch 27 and the acceleration switch 28 may be of a push type and it is turned on only when it is pressed while it is automatically turned off once it is released. The coast switch 29 and the resume switch 30 may be of a swingable lever type, wherein their operation section is shared with each other and they are constantly biased in the neutral positions in which they are turned off, while the coast switch 29 is turned on when it is swung toward one direction and the resume switch 30 is turned on when it is swung toward the other direction.

Given the foregoing, conditions of executing the constant-speed cruising control are set as follows:

1. The main switch 26 is turned on.
2. The actual vehicle speed is over 40 kilometers per hour, for example.
3. All the set switch 27, acceleration switch 28, coast switch 29, resume switch 30, and cancel switch 31 are turned off. All of them may be referred to as command switch 44 in generic terms.
4. A predetermined time period (for example, 1 second) has elapsed after the main switch 26 was turned on.
5. The set switch 27 is once turned off in the state in which all the above conditions 1 to 4 are met.

As the set switch 27 is turned on, the vehicle speed at which the set switch 27 was turned on is set to a target vehicle speed and the constant-speed cruising control is executed is such a manner that the vehicle is driven and cruised at the target vehicle speed.

For the constant-speed cruising system according to the present invention, the target vehicle speed is set or changed in the following way.

The target vehicle speed keeps on increasing, on the one hand, while the acceleration switch 28 is pressed, and the actual vehicle speed at the time when the acceleration switch 28 is released is set as a target vehicle speed. The target vehicle speed is kept on decreasing, on the other hand, while the coast switch 29 is pressed, and the actual vehicle speed at the time when the coast switch 29 is released is set as a target vehicle speed.

The constant-speed cruising control can be released when the brake is operated, namely, when at least either of the brake switch 21 or 22 is turned on. When the resume switch 30 is turned on after the constant-speed cruising control is released by means of operation of the brake, the constant-speed cruising control is resumed at a new target vehicle speed to which the latest target vehicle speed immediately prior to braking operation is set.

Given the foregoing, the constant-speed cruising control is described hereinafter.

Figure 2:
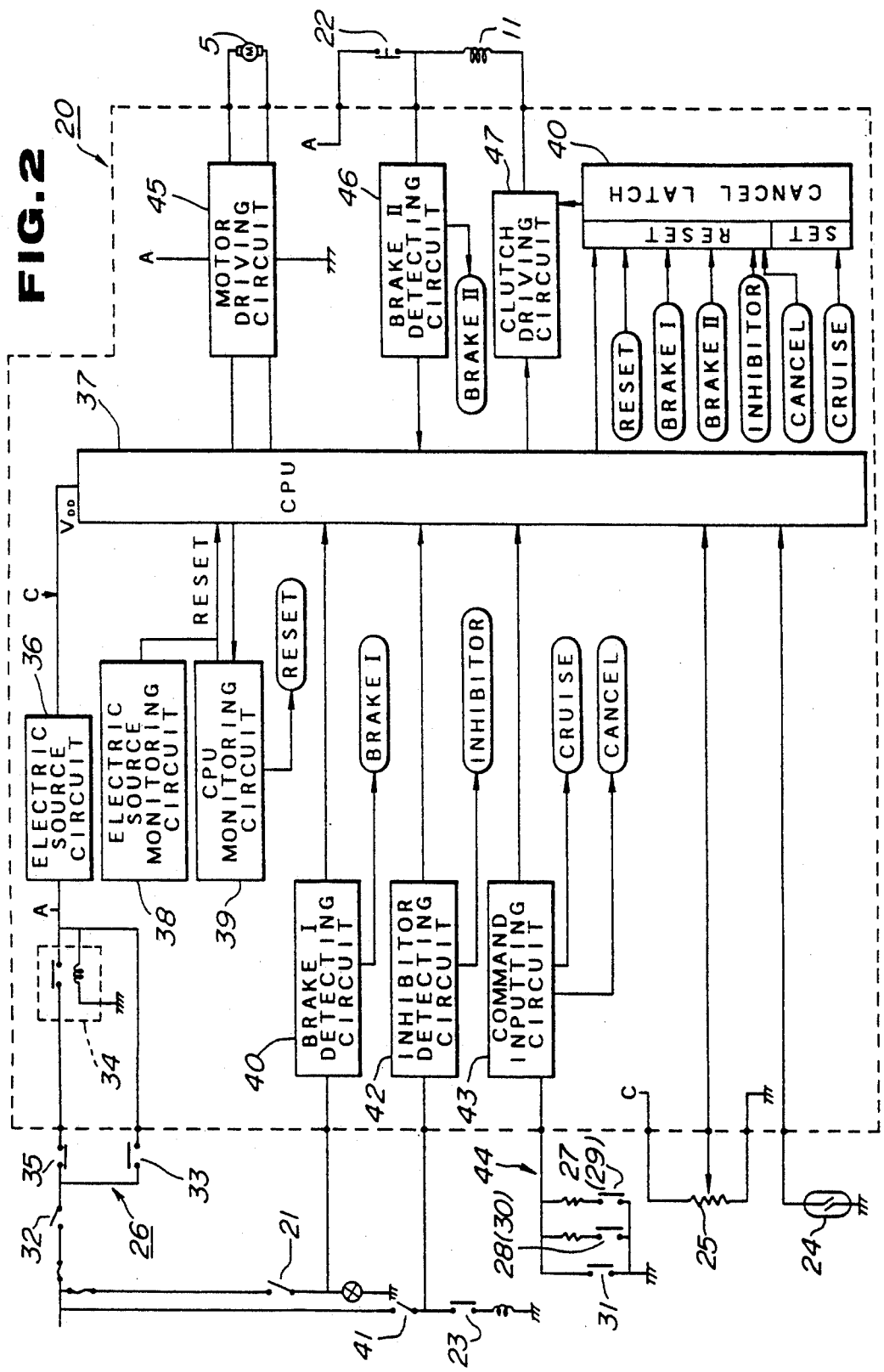
FIG. 2 is a block diagram of the control unit.

FIG. 2 is a view showing an outline of the control unit 20. When a normally open contact 33 of the main switch 26 is turned on while an ignition switch 32 is being turned on, the contact of a self-hold circuit 34 is turned on to hold a normally closed contact 35, thereby applying electricity to an electric source circuit 36 and starting a microcomputer 37 (CPU). When electricity is applied to an electric source monitoring circuit 38 and a CPU monitoring circuit 39 and the electric source circuit 36 is found abnormal, a reset signal is generated from the electric source monitoring circuit 38 to the CPU 37 which, in turn, generates a reset signal to the reset side of a cancel latch 40 consisting of a latch circuit in response to the reset signal. The CPU 37 is monitored by the CPU monitoring circuit 39 and, when the CPU 37 is found abnormal, a reset signal is generated to the reset side of the cancel latch 40 from the CPU monitoring circuit 39.

As the normally closed contact 35 of the main switch 26 is pressed and opened, the electric source is broken because the normally open contact 33 is turned off.

A brake I detecting circuit 50 senses an ON signal or an OFF signal of the first brake switch 21 and generates a first brake signal to the reset side of the cancel latch 40 in response to the ON signal.

An inhibitor detecting circuit 42 is to detect whether or not the inhibitor switch 23 connected in series to a starter switch 41 is turned on or off, and the signal detected (OFF signal) is inputted to the reset side of the cancel latch 40 as an inhibitor signal.

A command inputting circuit 43 detects the ON state or the OFF state of the command switch 44 consisting of the cancel switch 31, a combination of the acceleration switch 28 with the resume switch 30, and a combination of the set switch 27 with the coast switch 29 and, when the signal detected is a cruise signal for implementing cruising at a constant speed, the cruise signal is inputted to the set side of the cancel latch 40 and, when the signal detected is a cancel signal for suspending the constant-speed cruising, i.e., cruising at a constant speed, the cancel signal is inputted to the reset side of the cancel latch 40.

To the CPU 37 are inputted a signal of the throttle opening angle, $\theta$, detected by the potentiometer 25 and a signal of an actual vehicle speed detected by the vehicle speed sensor 24.

A brake II detecting circuit 46 is to detect whether or not the second brake switch 22 is turned on or off and generates a brake II signal to the reset side of the cancel latch 40 in response to the ON signal.

The CPU generates a control signal to a driving circuit 45 for the servo motor 5. The clutch driving circuit 47 couples or uncouples the clutch 11 on the basis of a control signal from the CPU 37 and an output signal from the cancel latch 40. In other words, when the reset signal, the brake I signal, the brake II signal, the inhibitor signal and the cancel signal are inputted to the reset of the cancel latch 40, the cancel latch 40 brings the clutch 11 into an open state (OFF state) by operation of the clutch driving circuit 47. On the contrary, when the cruise signal is inputted to the set side of the cancel latch 40, the cancel latch 40 is set to bring the clutch 11 into a coupled state (ON state).

Detail of Constant-Speed Cruising Control

FIGS. 3 to 6 are flow charts illustrating an embodiment of the constant-speed cruising control.

Figure 3:
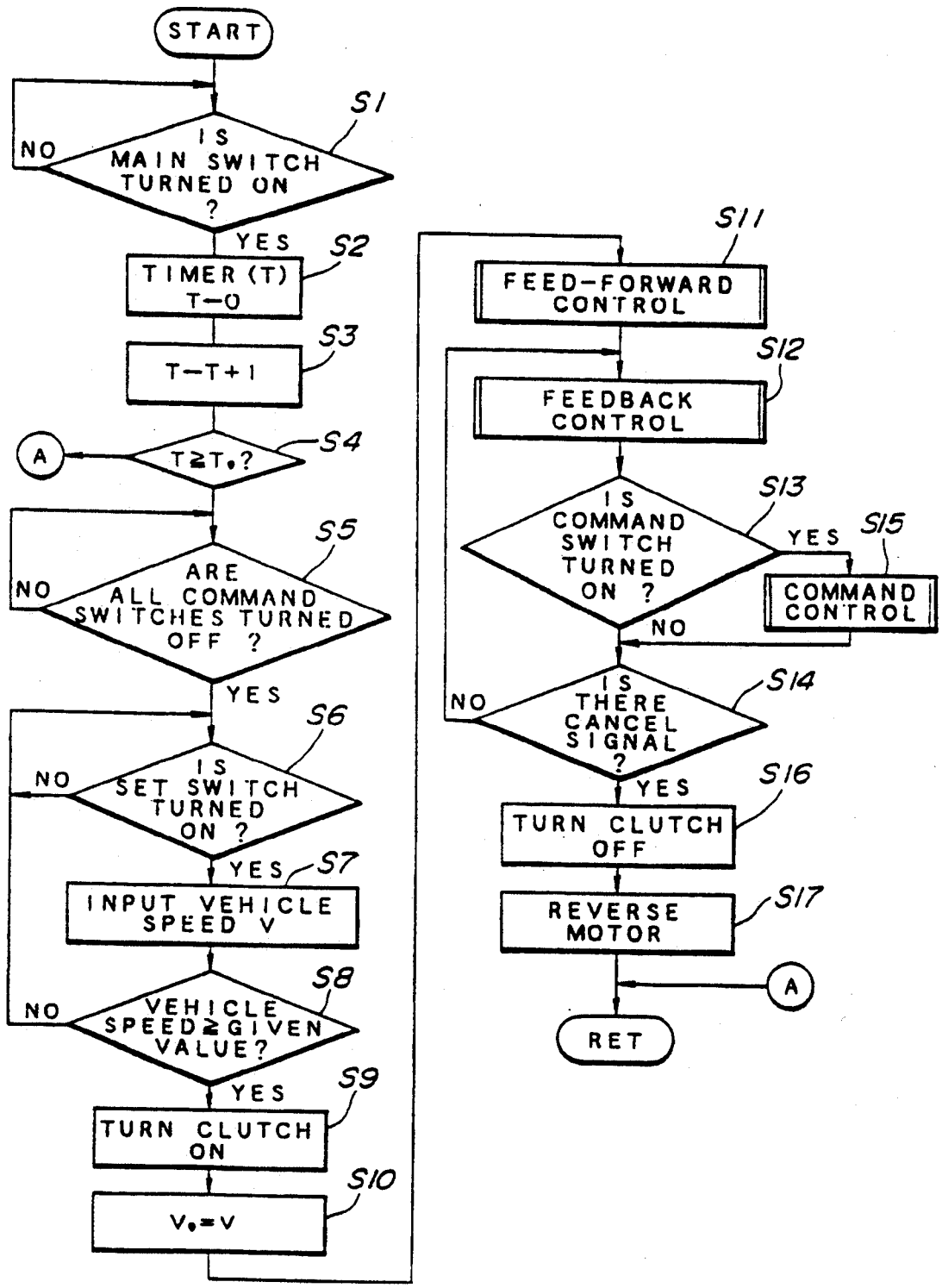
FIGS. 3 TO 6 are flow charts showing an embodiment of constant-speed cruising control.
Figure 7:
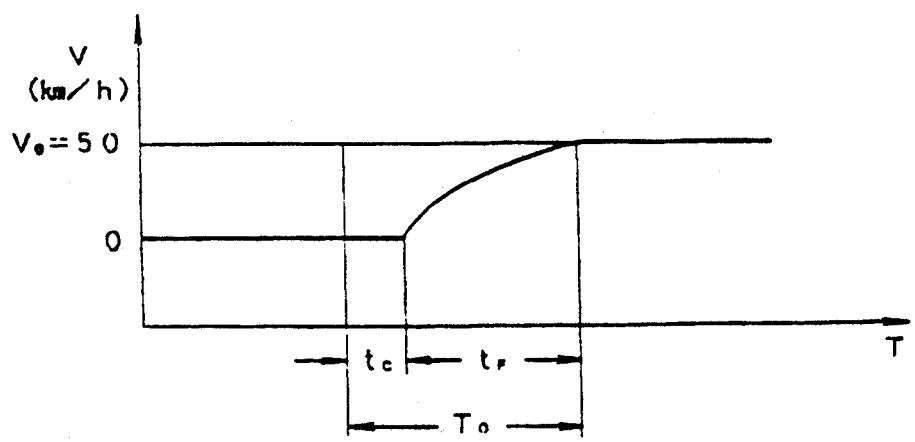
FIG. 7 represents the standard for setting the time for inhibiting constant-speed cruising control.

As shown in FIG. 3, the ON state of the main switch 26 is first confirmed at step S1. Then at step S2, a timer (T) is set and at step S3 the timer (T) is counted up. It is then judged at step S4 whether or not a predetermined time period To, for example, one second, has elapsed after the main switch 26 was turned on. The predetermined time period To is a combined time period To obtainable by combining a self-diagnosis time period $t_c$ of the CPU with a time period $t_F$ required for removing adverse influences and so on, such as noise, by accumulating a given amount of data on the vehicle speed from the vehicle speed sensor 24, as shown in FIG. 7. The timer (T) comprises a timer circuit disposed in the CPU 37. When the predetermined time period To has elapsed after the main switch 26 was turned on, one of the conditions for the execution of the constant-speed cruising control has been established so that the flow proceeds to step S5. In other words, the execution of the constant-speed cruising control is inhibited when the given time period To has not elapsed after the main switch 26 was turned on. This arrangement enables an accurate setting of a target vehicle speed corresponding to the actual vehicle speed. At step S5, it is confirmed that all of the switches making up command switch 44 are turned off. If the command switches 44, i.e., the set switch 27, the acceleration switch 28, the coast switch 29, the resume switch 30 and the cancel switch 31, are confirmed to be all turned off, then the constant-speed cruising control at step S6 and thereafter is started as one of the conditions for executing the constant-speed cruising control. In other words, if even one of the switches 27 to 31 would be stayed or fixed in its ON state or kept on, the start of the constant-speed cruising control at step S6 and thereafter is inhibited.

When all of the command switches 44 are confirmed to be turned off at step S5, the transfer to the constant-speed cruising control is allowed and the flow proceeds to step S6 at which the set switch 27 is turned on. Then at step S7, the actual vehicle speed V at this point of time is read. It is then judged at step S8 whether or not the actual vehicle speed V is greater than a predetermined value, i.e., 40 km/hour, for example. If it is confirmed at step S8 that the actual vehicle speed V is greater than the predetermined value, the flow proceeds to step S9 and the clutch 11 is coupled as all of the conditions for executing the constant-speed cruising control are met. Then at step S10, the actual vehicle speed V is stored as a target vehicle speed Vo and the opening angle of the throttle valve 3 is adjusted by feedback control so as to allow the actual vehicle speed V to reach the target vehicle speed Vo at step S12 after feed-forward control at step S11. This feedback control is continued unless the command switch 44 is operated (S13 and S14). The feed-forward and feedback control will be described more in detail hereinafter.

Once the command switch 13 is operated during the execution of the constant-speed cruising control, the flow proceeds to step S15 or S16. More specifically, when the acceleration switch 28 or the like, except for the cancel switch 31, out of the command switch 44, is operated, on the one hand, the flow proceeds to step S15 where command control is executed. When the cancel switch 31 is operated, on the other hand, the flow proceeds to step S16 where the clutch 11 is turned off to bring it into its OFF state to thereby uncouple the throttle valve 3 from the servo motor 5. Then at step S17, the servo motor 5 is reversed to its initial position and brought into a waiting state for the constant-speed cruising control to come next.

Feed-forward Control

Figure 4:
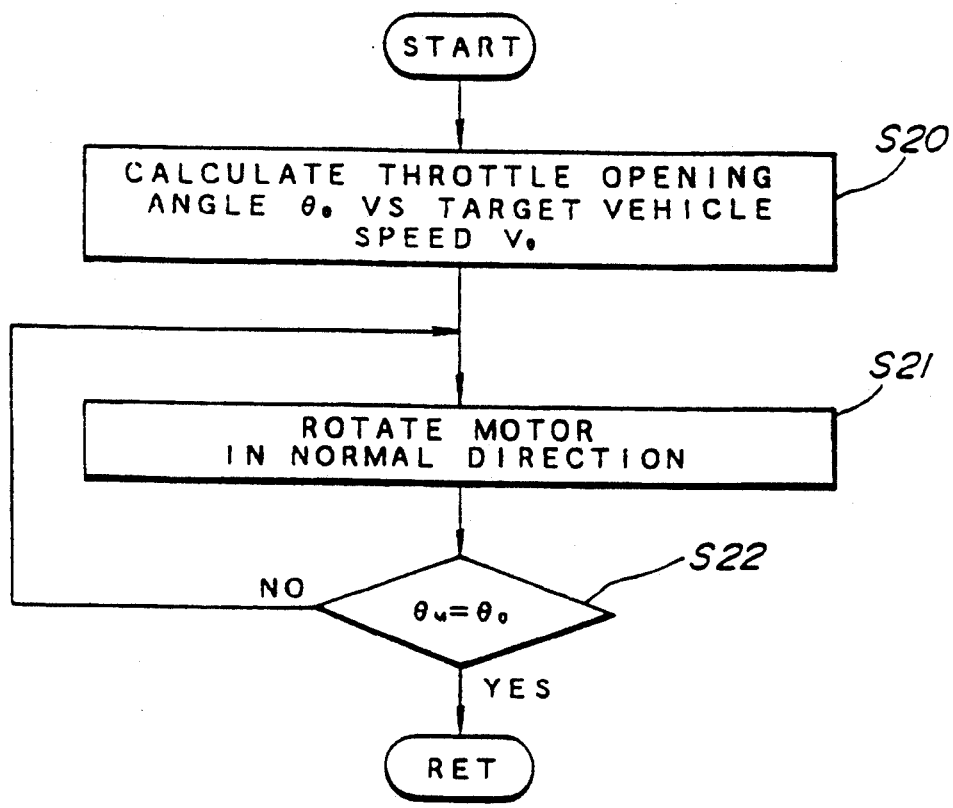

FIG. 4 is a flow chart representing an embodiment of the feed-forward control at step S11 and thereafter as will be described hereinafter. In the feed-forward control, the degree of inclination of the road surface on which the vehicle is running and the throttle opening angle $\theta$ with respect to the degree of inclination of the road surface is set as an estimated opening angle. In other words, the throttle opening angle $\theta$ in accordance with the degree of inclination of the road surface is provided prior to the transfer to the feedback control (step S9 etc.), in order to realize a rapid convergence to the target vehicle speed Vo.

Given the foregoing, first at step S20, the throttle opening angle $\theta_o$ with respect to the target vehicle speed Vo is given on the basis of a predetermined table and then the servo motor 5 is rotated so as for the throttle opening angle to reach the throttle opening angle $\theta o$ (steps S21 and S22).

Feedback Control

Figure 5:
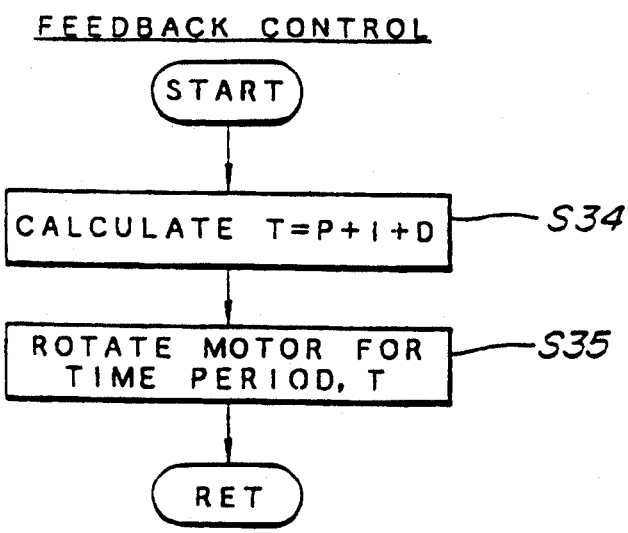

FIG. 5 is a flow chart showing the specific control content of the feedback control. The feedback control referred to herein is PID control. At step S34, the time period T for which electricity is applied to the servo motor 5, in accordance with a vehicle speed variation $v$ between the actual vehicle speed V and the target vehicle speed Vo, i.e., $v = V - Vo$, is calculated by the following formula:

$$T = I + P + D$$

$I = Ki \times vn$
$P = Kp \times (vn - vn - 1)$
$D = Kd \times (vn - 2vn - 1 + vn - 2)$ where Ki is an integral constant;

Kp is a proportional constant;
Kd is a differential constant;
$vn$ is a deviation of the current vehicle speed;
$vn-1$ is a deviation of the latest vehicle speed; and
$vn-2$ is a deviation of the second latest vehicle speed.

Command Control

Figure 6:
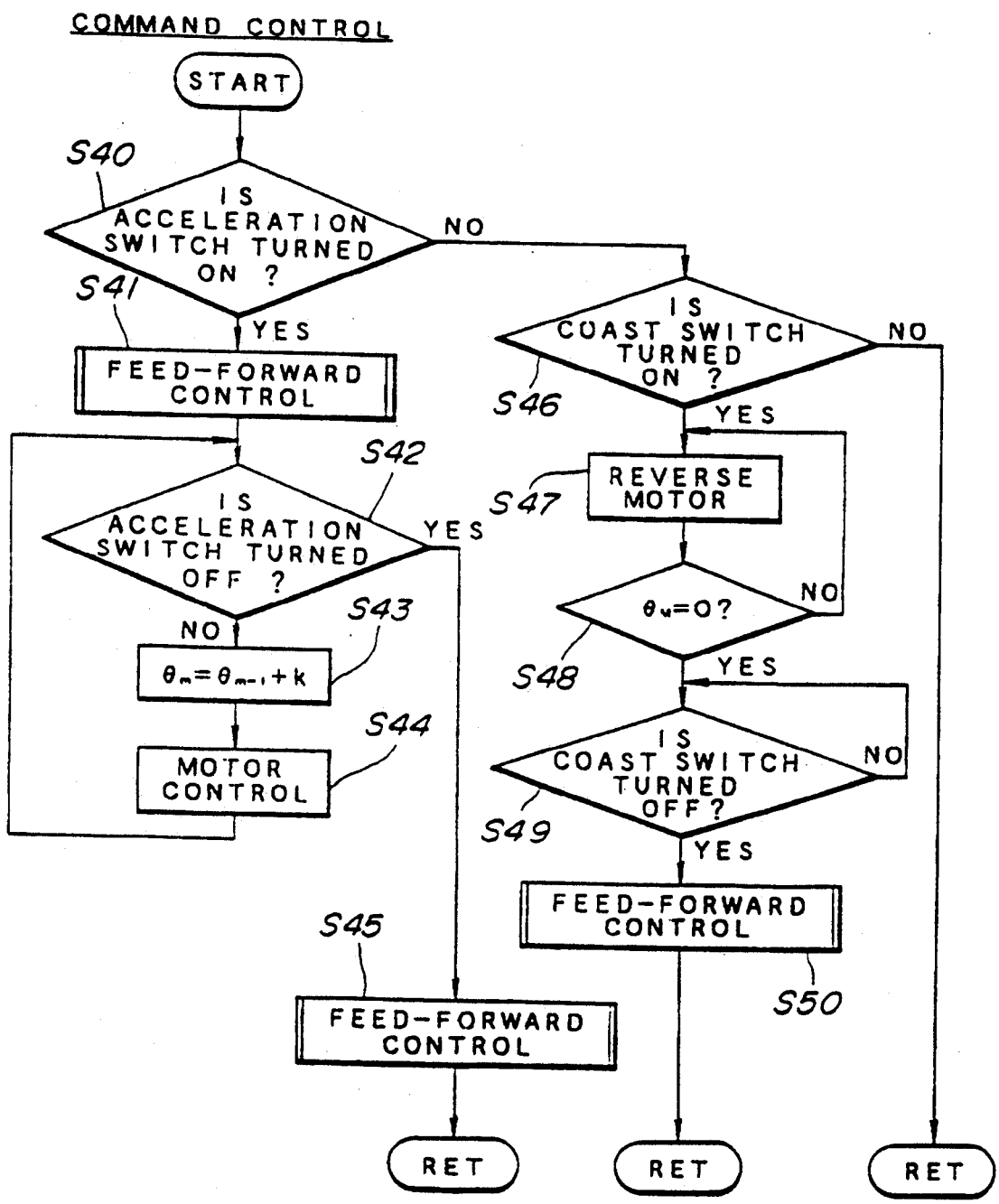

FIG. 6 is a flow chart indicating the specific content of command control at step S15 (FIG. 3).

When it is decided at step S40 that the acceleration switch 28 is turned on, the vehicle speed at the time when the acceleration switch 28 was turned on is subjected to feed-forward control immediately thereafter. As long as the acceleration switch 28 is turned on, acceleration is increased and the throttle opening angle $\theta_m$ is enlarged so as to reach a target throttle opening angle $\theta_m$ ($\theta_m = \theta_{m-1} + k$; wherein k is a given value) at steps S42–S44. At the time when the acceleration switch 28 is turned off, the flow proceeds to step S45 where the vehicle speed at that time is set as a target vehicle speed Vo. Then the constant-speed cruising control is implemented by means of the feedback control (step S9) after feedforward control.

When the coast switch 29 is turned on, control after step S46 is executed. As long as the coast switch 29 is turned on, the servo motor 5 is reversed to its capacity limit to decelerate under the full closed condition of the throttle valve 3 (steps S46–S49). At the time when the coast switch 29 is turned off, the flow proceeds to step S50 where the vehicle speed at that time is set as a target vehicle speed $V_o$. Then the constant-speed cruising control is executed by means of the feedback control (step S9) after feedforward control.

The present invention has been described by way of the preferred embodiments and it is to be understood that the present invention is not restricted to those embodiments.

For diesel engines, an amount of injection of fuel from a fuel injecting valve may be adjusted as a vehicle speed governing means in the constant-speed cruising apparatus. In order to allow for a time period, it is also possible to set the predetermined time period T to a time period which is longer than the combined time period To of the self-diagnosis time period $t_c$ and the time period $t_F$ for accumulating data on vehicle speed. It is also possible to allow the CPU 37 to generate a signal indicating completion of its own initial check and release the conditions of executing the constant-speed cruising control by means of the signal for completion of the initial check of the CPU 37, in place of the predetermined time period T.

It is to be understood that the foregoing text and drawings relate to embodiments of the present invention given by way of examples but not limitation. Various other embodiments and variants are possible within the spirit and scope of the present invention.

What is claimed is:

1. A constant-speed cruising system for a vehicle, comprising:
    a vehicle speed governing means of an engine;
    a means for detecting a vehicle speed;
    a control unit for constant-speed cruising control, which controls the vehicle speed governing means so as for a vehicle speed to reach a target vehicle speed, the control unit is controlled to allow the vehicle speed detected by the means for detecting a vehicle speed to become the target vehicle speed;
    a main switch for turning on or off a supply of an electric source to the control unit; and
    a set switch for setting a vehicle speed at a point of time when the set switch is manually turned on to the target vehicle speed for constant-speed cruising control;
    wherein the control unit has an inhibition means for inhibiting the setting of the target vehicle speed on the basis of the set switch for a lapse of a predetermined period from the point of time when the main switch is turned on, said predetermined period being set to at least a period of time required for initializing and for accumulating vehicle speed data necessary for setting an accurate target vehicle speed, and said inhibition means for inhibiting the setting of the target vehicle speed inhibits the setting of the target vehicle speed on the basis of the set switch by inhibiting a signal to be entered into the control unit from the set switch.

2. A constant-speed cruising system as claimed in claim 1, wherein:
    the control unit comprises a microcomputer; and
    the setting of the target vehicle speed and the inhibition means for inhibiting the setting of the target vehicle speed are performed by an operating program of the control unit.

3. A constant-speed cruising system as claimed in claim 1, further comprising means for performing a self-diagnosis of the control unit, and wherein said predetermined period is set by further adding a period of time required for the self-diagnosis of the control unit.

4. A constant-speed cruising system as claimed in claim 1, wherein said predetermined period is set to approximately 1 second.

5. A constant-speed cruising system as claimed in claim 1, wherein said predetermined period is a combined period of time To of a self-diagnosis time period $T_c$ and a time period $t_f$ for accumulating data on the actual vehicle speed.

6. A constant-speed cruising system as claimed in claim 1, wherein said predetermined period is longer than a combined period of time To of a self-diagnosis time period $t_c$ and a time period $t_F$ for accumulating data on the actual vehicle speed.

* * * * *